Dec. 16, 1958 F. N. ROTHACKER 2,864,755
METHOD AND APPARATUS FOR THE TREATMENT OF PLASTIC MATERIALS
Filed Jan. 10, 1957 3 Sheets-Sheet 1
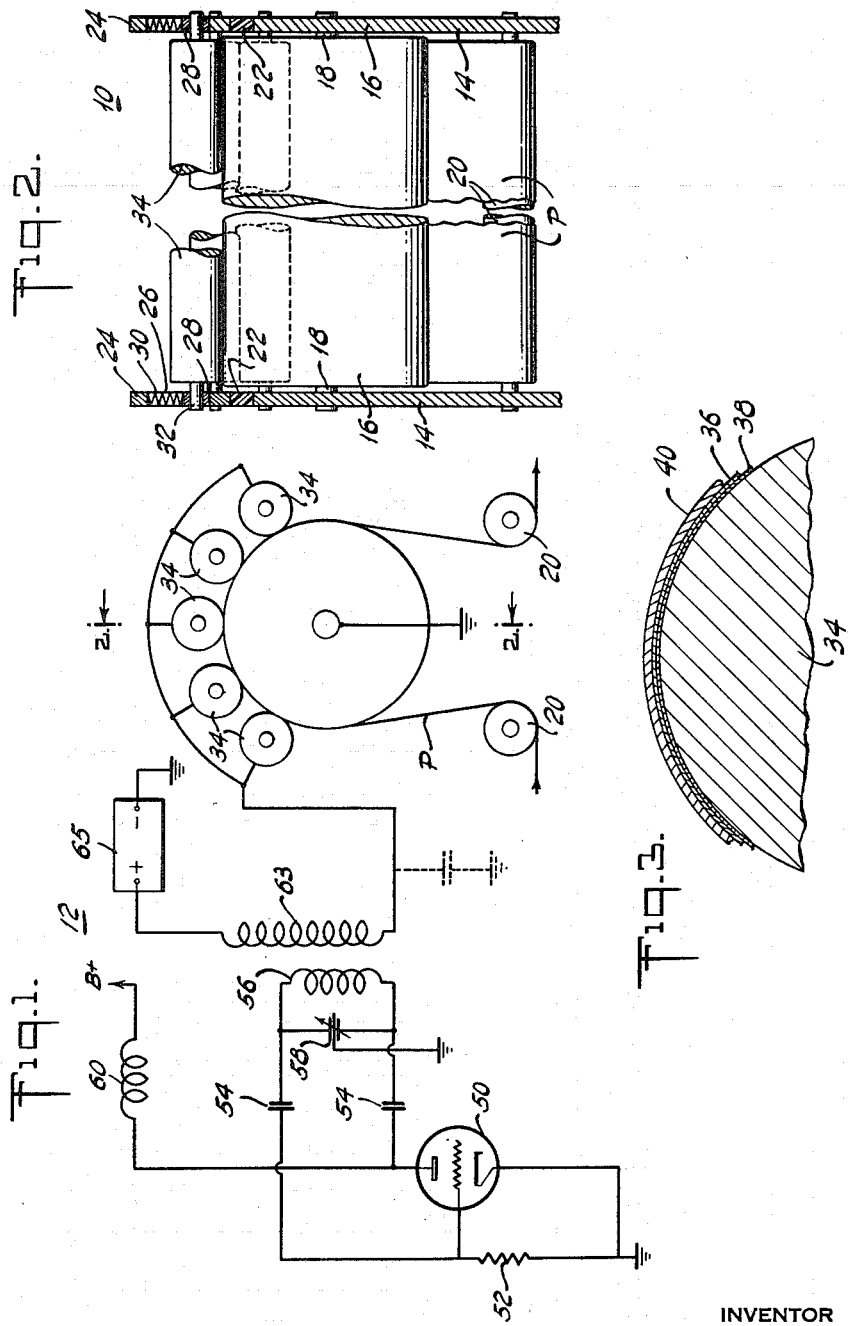
INVENTOR
FRANCIS NEILL ROTHACKER
BY William R Liberman
ATTORNEY

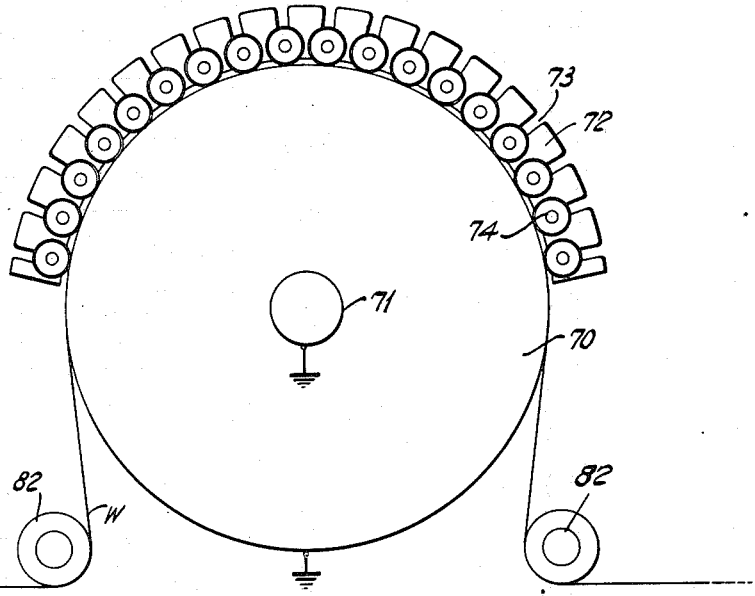
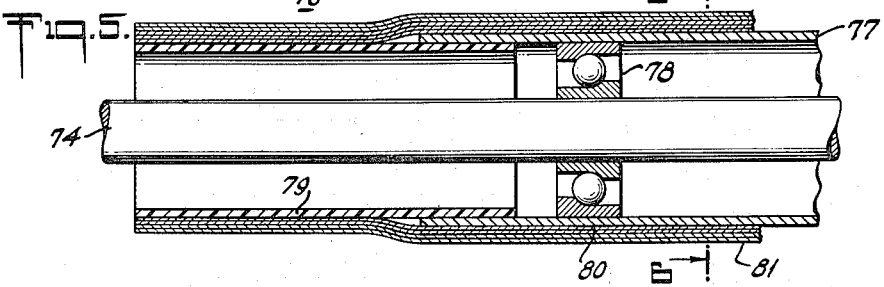
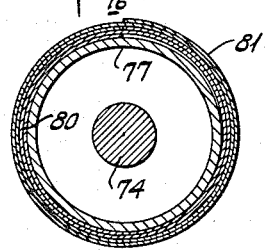

Dec. 16, 1958  F. N. ROTHACKER  2,864,755
METHOD AND APPARATUS FOR THE TREATMENT OF PLASTIC MATERIALS
Filed Jan. 10, 1957  3 Sheets-Sheet 3
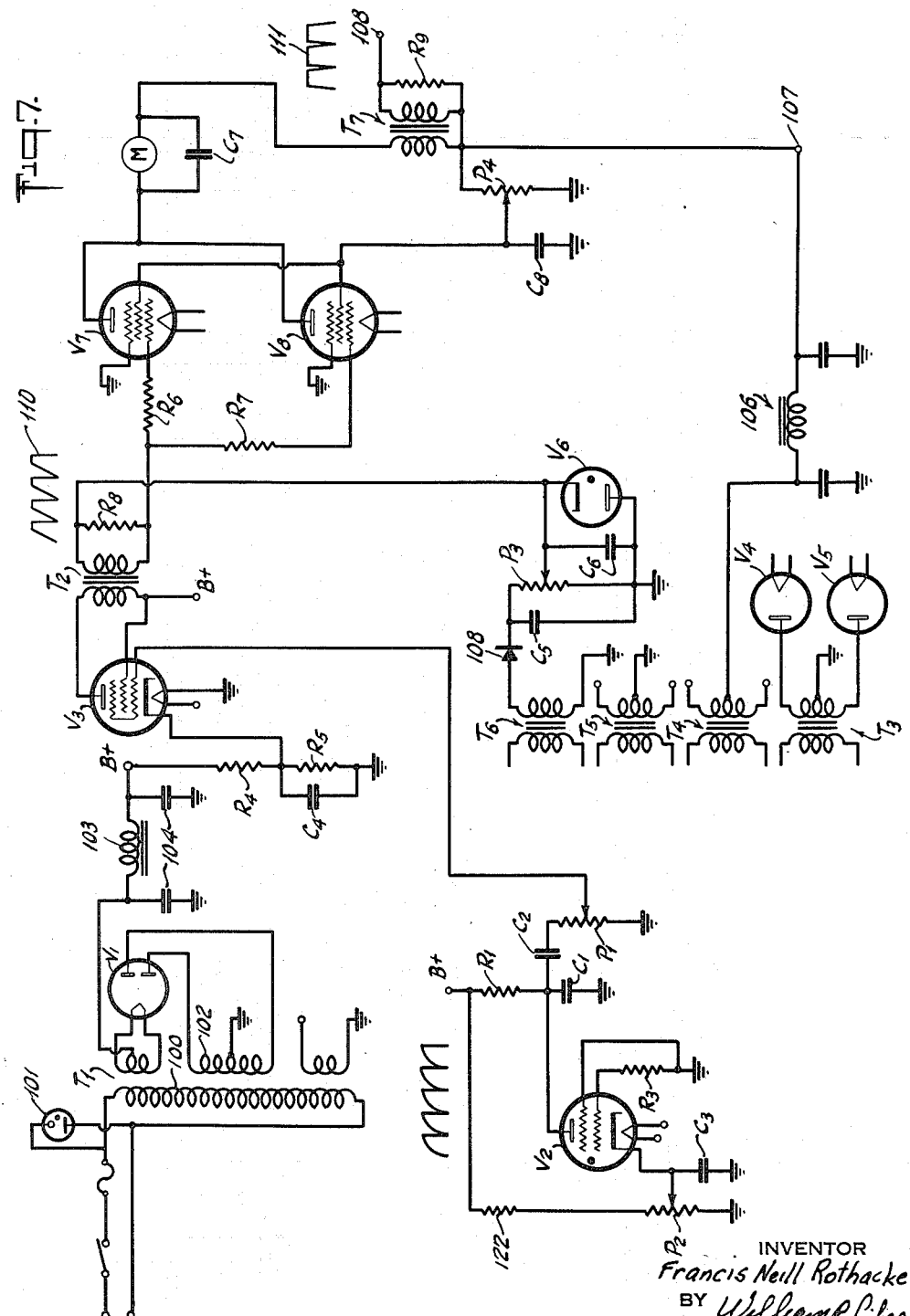
INVENTOR
Francis Neill Rothacker
BY William R. Liberman
ATTORNEY United States Patent Office 2,864,755
Patented Dec. 16, 1958

2,864,755
METHOD AND APPARATUS FOR THE TREATMENT OF PLASTIC MATERIALS

Francis Neill Rothacker, East Orange, N. J., assignor to Modern Plastic Machinery Corp., Lodi, N. J., a corporation of Delaware Application January 10, 1957, Serial No. 633,450

23 Claims. (Cl. 204—165)

The present invention relates generally to an improved method and apparatus for the treatment of materials to alter the characteristics thereof, and in particular it relates more to an improved method and apparatus for treating an organic plastic material to increase the adhesive properties thereof and to render its surface suitable for the reception and retention of coatings, such as laminates, adhesives, decorative material, or copy by printing and other processes.

Many organic plastic materials, such as polyethylene, for example, are extremely difficult to print or otherwise apply to material thereto since the surface of the untreated plastic has a low adherency to and compatibility with the conventional inks and other substances which it is often desired to apply thereto. As a consequence, the ink or other substance applied to these plastic surfaces readily wipe or peel off and the results are completely unsatisfactory. There have been proposed and employed many methods to alter the surface characteristics of these plastics to render them receptive, adherent to and compatible with the conventional inks and coatings employed therewith. These processes have been of a chemical, electrical and radiant nature, but have heretofore possessed numerous drawbacks and disadvantages. The chemical treatment of the plastic is expensive and time-consuming and requires considerable equipment. It has been proposed to pass the plastic web, in the case of polyethylene, through or in confrontation with a gas flame to improve its ink reception properties. This method is, however, difficult to control and results in high losses.

The electrical methods employed for treating polyethylene preparatory to printing thereof likewise possesses numerous drawbacks. While the methods and machines disclosed in the copending patent applications of Francis Neill Rothacker, Serial No. 513,968, filed June 8, 1955, and Serial No. 544,267, filed November 1, 1955, now U. S. Patent No. 2,802,085, are satisfactory for the treatment of polyethylene containing little or no additives, they leave much to be desired in the treatment of polyethylene containing fatty or oily slip agents. The other machines and methods heretofore available for electrically treating polyethylene are not only completely unsatisfactory in treating polyethylene containing fatty or oily slip agents, but possess numerous disadvantages in treating polyethylene lacking the aforesaid additives.

It is thus a principal object of the present invention to provide an improved method and apparatus for the treatment of material to alter the characteristics thereof.

Another object of the present invention is to provide an improved method and apparatus for the treatment of the surface of an organic plastic material to improve the printing and coating properties thereof.

Still another object of the present invention is to provide an improved method and apparatus for the treatment of the surface of an advancing web of organic material to improve the printing and coating properties thereof.

A further object of the present invention is to provide an improved method and apparatus for treating the surface of an advancing web of polyethylene to alter the characteristics thereof.

Another object of the present invention is to provide an improved method and apparatus for the treatment of polyethylene containing slip agents to improve the printing and coating properties of the polyethylene.

Still another object of the present invention is to provide an improved method and apparatus for the treatment of slip agent containing polyethylene to improve the printing and coating properties thereof without adversely affecting the sealing and other desirable properties.

Still a further object of the present invention is to provide an improved method for treating the surface of an advancing web of polyethylene to alter the characteristics thereof, which method and apparatus are simple, inexpensive and rapid.

Another object of the present invention is to provide an improved method and apparatus for treating the surface of an advancing web of polyethylene to alter the characteristics thereof, the speed and depth of treatment and the resulting properties of the polyethylene being simply adjustable.

The above and other objects of the present invention will become apparent from a reading of the following description, taken in conjunction with the accompanying drawing, wherein:

Figure 1 is a diagrammatic and schematic view of the improved apparatus for practicing the present improved process and the electrical network associated therewith;

Figure 2 is a front elevational view, partially broken away and partially in section, of a plastic web treating device embodying the present invention;

Figure 3 is an enlarged detailed transverse sectional view, partially broken away, of the upper treating rolls;

Figure 4 is a side elevational diagrammatic view of another form of apparatus which may be employed in practicing the present novel process;

Figure 5 is a detail enlarged longitudinal sectional view of one of the upper roller electrodes;

Figure 6 is a sectional view, taken along line 6—6 in Figure 5; and

Figure 7 is a schematic view of another circuit network which may be advantageously employed in the present process.

A feature of the present invention originates in the discovery that when a synthetic organic plastic webbing or other article, such as polyethylene, polytetrafluoroethylene, polymonochlorotrifluoroethylene, nylon, polyvinylchloride, Mylar (polyethylene terephthalate), has a face thereof in physical contact with a dielectric material different than the plastic article and the opposite face thereof in contact with another electrode and a pulsating or varying electric field is established directed at least in part from the dielectric material toward the plastic article, that is, the dielectric material is at least at times at a higher positive potential than the plastic article, the surface properties of the article which abutted the dielectric material are strongly altered and rendered receptive to printing or coating, whereas the surface of the plastic webbing which abutted the surface of the other electrode is inappreciably affected.

The heretofore available methods and apparatuses for electrically treating polyethylene webbing were entirely unsatisfactory where the webbing contained oil or wax additives or other conventional slip agents. The treatment is either too slow or inadequate, uniformity was lacking and the characteristics of the material were otherwise adversely affected. Furthermore, the equipment employed was subjected to strong corrosive action and electrical breakdown requiring frequent periodic shutdown and servicing.

In accordance with a first embodiment of the present invention a polyethylene webbing is continuously transported between a pair of electrodes which may be defined by first and second rolls or cylinders which are urged toward each other, the second rolls having a conducting base covered by a dielectric material different from the webbing being treated and the first electrode or cylinder preferably having a conducting face or surface or covered with a dielectric material differing from said second dielectric material. The second cylinder is connected to a positive potential having an alternating current superimposed thereon, the other cylinder being grounded. While an unbiased alternating current would be operable, superior results are experienced when a steep edged alternating or fluctuating voltage is superimposed upon a steady voltage so that the dielectric covered electrode is always at a positive potential relative to the electrode with the conducting surface. The polyethylene webbing in passing between the cylinders contacts both cylinder surfaces.

It has further been found that the material of which the second electrode dielectric covering is made affects the degree of rapidity of the plastic treatment, as well as the voltage required. Kraft and other papers are highly preferred requiring relatively low voltages and effecting a rapid uniform treatment of easily controllable intensity or depth and extent. Furthermore, the paper is not subject to noticeable deterioration as a result of the ambient electric fields, thus minimizing servicing requirements and shutdowns. The treatment of the plastic webbing is not adversely affected by the presence of wrinkles in the webbing, a condition which seriously affects the treatment by conventional processes. Moreover, the area of treatment can be very closely controlled so, if desired, the edges of the webbing may be left untreated to a small fraction of an inch to facilitate the heat sealing thereof.

The second electrode dielectric covering should be as thin as possible, just thick enough to inhibit electrical breakdown thereof and preferably not in excess of 20 mils. For example, two plies or wraps of kraft paper of 3 mil thickness has proven highly efficient from the standpoint of treatment and durability as well as a single wrap of 3 mil kraft paper with an underlayer of 2 plies of 4 mil wax paper. Other materials which may be used to advantage as the dielectric covering are nylon, polyvinyl chloride, varnished or shellacked silk, linen, cambric or other cloths, etc. It is believed that those materials are best suited for the present purpose which readily acquire a static positive charge when in contact with the plastic webbing being treated and in the presence of a pulsating electric field extending from the dielectric to the plastic webbing while the plastic webbing acquires a negative charge. The dielectric made should have a dielectric loss factor greater than the material being treated and preferably at least 10 and desirably 50 to 100 times greater and in excess of 0.01 at 1000 cycles per second.

The voltage applied between the electrodes is dependent upon the material being treated, the speed of treatment and the desired intensity of the treatment. For example, where polyethylene without any additives is being treated the required voltage is considerably less than when polyethylene containing wax or oil slip agents is being treated, all other parameters remaining the same. It has been found that under normal conditions the optimum D. C. voltage is between 1000 and 3000 volts and the optimum superimposed A. C. voltage is between 900 and 2900 volts. It is preferable that the dielectric carrying electrode does not swing negative relative to the other electrode. The frequency of the superimposed A. C. voltage advantageously has a strong component in excess of a kilocycle per second, preferably in excess of several kilocycles per second and as high as a megacycle per second or more. It has further been found that the voltage required to effect the desired treatment is influenced by the electrical condition of the plastic webbing being subjected to the treatment. Thus, where an electrostatic charge is applied to the webbing prior to its passage between the electrodes the intensity of the required voltage applied to the electrode is reduced. This electrostatic charge may be frictionally or otherwise applied to the advancing web as it is fed to the machine such as by means of an apron of a suitable material, for example, burlap or the like, engaging the surface of the traveling web.

The surface of the polyethylene which passes in engagement with the surface of the dielectric covered electrode is rendered highly receptive to the inks, adhesives and other materials employed in printing on or otherwise coating and decorating the polyethylene, to which these inks and materials tenaciously adhere. The opposite surface of the polyethylene is insignificantly affected. The treatment of the traveling polyethylene web may be effected as the web is fed to the continuous printing press, the surface passing in contact with the second dielectric covered electrode being printed upon or otherwise coated or decorated. In the alternative, the polyethylene web may be treated independently or immediately following its extrusion and before the winding and packaging thereof.

Referring now to the drawings, which illustrate a preferred form of apparatus which may be employed in practicing the present improved process, the numeral 10 generally designates an electrode system by which an advancing plastic web P may be treated and the numeral 12 designates the electrical network for applying the required voltages to the various electrodes. The electrode system 10 includes a support frame consisting of a pair of side upright members 14 carrying between them adjacent their upper end a freely rotatable metal drum 16 mounted on an axle 18 and defining a first electrode. A pair of idler guide rolls 20 are carried by and between the lower ends of the support members 14 and are disposed below the opposite edges of the drum 16. An auxiliary support frame is mounted on the upper edge of the side members 14 and is electrically separated therefrom by means of standoff insulators 22. The auxiliary support frame includes a pair of side members 24 provided with a plurality of oppositely disposed pairs of slots 26 extending radially relative to the longitudinal axis of the drum 16. Slidably located in each of the slots 26 is a bearing 28 which is urged toward the axis of the drum 16 by means of helical compression springs 30. Supported by and between each pair of oppositely disposed bearings 28, by means of a shaft 32, is a metal roller 34. Each of the rollers 34 has its cylindrical surface covered by a dielectric material, as aforesaid. Thus, as seen in Figure 3 of the drawing, the dielectric covering consists of a pair of underlayers of wax paper 36 and 38 of 4 mil thickness each and an outer layer 40 of kraft paper of approximately 3 mil thickness. In the absence of a treated web the electrodes 34 are spring urged into contact with the electrode 16.

The electrical network 12 is in the form of a Colpitts oscillator, although other types of oscillators may be employed, transformer coupled between the electrodes 16 and 34 in series with a source of D. C. voltage. More specifically, the network 12 includes a triode 50, the cathode of which is grounded and the grid of which is likewise grounded through a grid resistor 52. Connected between the plate and the grid of the triode 50, by way of coupling and isolating condensers 54 is a tank coil 56. The stators of a tuning condenser 58 are connected to opposite terminals of the tank coil 56, the rotor thereof being grounded. The anode of the triode 50 is connected by way of an R. F. choke 60 to the positive terminal of a suitable plate voltage supply 65, the negative terminal of which is grounded.

A coil 63 is inductively coupled to the tank coil 56 and has one end thereof electrically connected to the second electrodes 34, which are electrically interconnected, and the other end thereof connected to the positive terminal of an adjustable D. C. voltage supply 65, the negative terminal of which is grounded. The first electrode 16 is likewise connected to ground. The range of adjustability of the D. C. voltage supply 65 is preferably up to approximately 4000 volts, and the output of the oscillator should be such as to induce a voltage in the coil 63, which is likewise adjustable up to approximately 4000 volts. Furthermore, in order to effect an efficient energy transfer between the oscillator and the electrodes the oscillator frequency should be adjusted by means of the tuning capacitor 58 to the resonant frequency of the electrode circuit, which is a function of the coil 63 and the interelectrode capacitance. The frequency is preferably of the order of about a megacycle, although this may be varied as has been previously described.

In accordance with the specific example of the machine above described, the first cylindrical electrode 16 is 8 inches in diameter and 8 inches long. The second electrodes 34 are five in number, each being 2 inches in diameter and 7¾ inches long and centrally located relative to the first electrode 16. The center-to-center distance between the successive electrodes 34 is approximately 3 inches.

In accordance with an embodiment of the present process employing the above apparatus, a 1½ mil thick, 8 inch wide continuous web P for polyethylene containing a slip agent, for example, DXM 20, which is manufactured by the Bakelite Co., a division of Union Carbide and Carbon Corp., is passed below the trailing idler roll 20 about the first electrode drum 16 and below the leading idler roll 20, the second electrodes 34 being spring urged, as aforesaid, into contact with the upper surface of the polyethylene web P. The resonant frequency of the system is approximately 1 megacycle and the condenser 58 is correspondingly adjusted. The D. C. power supply 65 is adjusted to a 2000 volt output and the oscillator is adjusted so that the peak A. C. voltage is 1900 volts. The polyethylene web P is advanced at 100 feet per minute and the treatment effected on the upper surface of the web P, which passes in contact with the dielectric covering of the electrodes 34 and is in excellent condition for the reception of ink. The web P may be fed directly from the electrode system to a rotary printing press of the conventional type using the inks generally employed in the printing of polyethylene, the printing being applied to the upper surface of the web P. However, it has been found that many advantages are realized when the polyethylene is treated when it has been freshly extruded, such as immediately following its extrusion and in line with the extrusion apparatus. In the latter case, greater speeds and efficiencies are achieved at lower voltages and power consumptions. The power consumed in the treatment of the polyethylene in the above example is approximately 35 watts. In the treatment of the same material by previously known conventional methods the required A. C. voltage was about 8000 volts, the power consumed 180 watts, and the treatment effected was far from satisfactory.

As noted above, the voltage required for effecting the treatment of the polyethylene may be reduced substantially by as much as 30% by applying a static charge to the plastic web before it traverses the treatment zone. By passing the web P in contact with a burlap or cloth apron the web acquires a static charge of several thousand volts. To increase the speed of treatment the A. C. and D. C. voltages are correspondingly increased and preferably the frequency of the A. C. voltage. It should be pointed out that the edges of the polyethylene web P remains substantially untreated by reason of the electrode 34 being shorter than the width of the web P. This is of great advantage inasmuch as the heat sealing properties of the polyethylene web P along the untreated edge are substantially unaffected.

Referring now to Figures 4 through 7 of the drawings which illustrate another improved apparatus by which the present process may be practiced, the numeral 70 generally designates a freely rotatable cylinder formed entirely of a conducting material or having its surface in the form of an electrically conducting material, the cylinder 70 being freely rotatable on a shaft 71 and having its outer conducting surface grounded. Arranged about the periphery of the cylinder 70 are a pair of arcuate parallel longitudinally spaced electrode holders 72 extending for about 160° along the upper periphery of the cylinder 70 and being provided with a series of regularly spaced respectively aligned radially extending slots 73. A metal shaft 74 registers with each pair of aligned slots 73 and carries a freely rotatable cylindrical electrode 76.

Each of the electrodes 76 comprises a longitudinally extending cylindrical body member 77 formed of a metal or other suitable conducting material and rotatably carried by a respective shaft 74 by means of a suitable pair of longitudinally spaced ball bearings 78. An insulating sleeve 79 partially telescopes the free end of each of the cylindrical members 77 and extends beyond the free edge thereof. Each of the body members 77 and the insulating extensions 79 are covered with successive layers 80 of a high strength dielectric material and superimposed layers 81 of a dielectric material different from the webbing being treated, as has been hereinbefore set forth. For example, the layers 80 may include two wraps of 1½ mil Mylar (polyethylene terepthalate) film superimposed by the dielectric layers 81. Suitable adhesives are employed to effect the permanent retention of the layers 80 and 81. The layer 81, for example, may be formed of two wraps of 2 mil paper which may be impregnated with Glyptal (alkyd resin adhesive) or may consist of linen, cotton, rayon, polyvinyl chloride, polyvinyl chloride and polyvinyl acetate, copolymer, tar or asphalt paper and the like. In place of the Mylar there may be employed such materials as polytetrafluoroethylene, polychlorotrifluoroethylene, nylon, or similar high dielectric strength materials.

As hereinbefore set forth the material forming the layer 81 should have a higher dielectric loss factor than the material being treated, preferably many times the dielectric loss, for example, 10 to 50 times and preferably in excess of .01 at a kilocycle per second. The electrodes 76 are carried in the respective slot 73 of the holder 72 so as to be freely movable towards the drum electrode 70 by their own weight so as to come in contact with the surface of the drum electrode 70. It should be noted that the drum electrode 70 may be also coated with a dielectric material, but the material coating the drum 70 should be different from the material coating the electrodes 76 and should have an appreciably lower dielectric loss factor and is preferably of a material similar to that being treated. A pair of suitable guide idler rolls 80 are disposed adjacent the lower level of the drum 70 to guide the webbing W around the upper periphery of the drum 70.

As a specific example of the treating apparatus above described, the drum 70 is 10 inches in diameter and at least as long as the width of the material to be treated. The electrodes 76 are approximately ¾ inch in diameter and preferably about ⅛ inch shorter than the width of the material being treated, the insulating sleeves 79 extending beyond the edges of such material. The center-to-center distance between the electrodes 76 are about ⅞ of an inch and they extend approximately 160° about the upper periphery of the drum 70. The electrodes 76 are electrically interconnected and are in turn connected to the positive terminal of a fluctuating voltage source, as will be hereinafter set forth.

Referring now to Figure 7 of the drawing which illustrates a circuit network for applying the desired voltage to the electrodes 74 and as characterized by a voltage output of a sharp edged wave superimposed upon a positive D. C. voltage. More specifically, the network includes a first power transformer T1 having a primary winding 100 connected through a fuse and by way of a switch to a source of alternating current and being shunted by an indicator bulb 101. A doubled diode B1 has its anodes connected to the terminals of the high voltage winding 102 of the transformer T1, the high voltage winding having a grounded center tap. The filament of the diode V1 is connected to the center tap filament winding of the transformer T1, the center tap thereof being connected to a conventional filter network including a choke 103 having its terminals grounded by way of capacitors 104, the output of the filter providing a B+ potential.

There is provided a relaxation oscillator having a sawtooth wave output and including a gas tetrode V2. The anode of the gas tetrode V2 is connected by way of the resistor R1 to the B+ voltage, is grounded by way of a capacitor C1 and is also grounded through a series connected capacitor C2 and the resistance element of a potentiometer P1. A series connected resistor R2 and resistance element of a potentiometer P2 are connected between the B+ terminal and ground, the arm of the potentiometer P2 being connected to the cathode of the gas tetrode V2 and being grounded by way of a capacitor C3. The control grid of the tetrode V2 is grounded through a resistor R3 and the screen grid is connected directly to ground.

A clipper amplifier includes a pentode V3 having its control grid connected to the arm of the potentiometer P1 and its cathode connected to the junction point of a pair of series connected resistors R4 and R5 extending from the terminal to ground, the resistor R5 being shunted by a capacitor C4. The anode of the pentode V3 is connected through the primary of a coupling transformer T2 to the B+ voltage supply. The screen grid of the pentode V3 is likewise connected to the B+ voltage and the supressor grid is connected directly to the cathode.

The main power supply includes a step up power transformer T3, filament transformers T4 and T5, and a C voltage supply transformer T6, the primaries of the transformers being connected to the line supply voltage through a conventional switching and fusing arrangement. A pair of diodes V4 and V5 have their anodes connected to the terminals of the secondary of the step up power transformer T3, the latter having a grounded center tap. The filaments of the diodes V4 and V5 are connected to the terminals of the filament transformer secondary T4, the center tap of which is connected by way of a filter network 106 to a terminal 107 defining the positive high voltage output terminal.

The secondary of the transformer T6 has one of its terminals grounded and its other terminal connected through a dry rectifier 108 and a filter condenser C5 to ground, the filter condenser C5 being shunted by the resistance element of the potentiometer P3. The arm of the potentiometer P3 is grounded by way of a condenser C6, the condenser being shunted by a gas voltage regulator tube V6, the cathode of which is connected to the potentiometer arm and the anode of which is grounded.

The power amplifier includes a pair of parallel power pentodes V6 and V7 the filaments of which are connected to the terminals of the secondary of the filament transformer T5 which is provided with a grounded center tap. The control grids of the pentodes V6 and V7 are connected by way of resistors R6 and R7 respectively to one terminal of the secondary of the transformer T2, the other terminal of which is connected to the cathode of the regulator tube V6 which defines a regulated grid bias supply. The secondary of the transformer T2 is shunted by a resistor R8. The anodes of the pentodes V6 and V7 are connected through a milliammeter M shunted by a capacitor C7 to one terminal of the primary of an output transformer T7, the other terminal of which is connected to the positive high voltage terminal 107. The high voltage terminal 107 is also connected to one terminal of the secondary of the output transformer T7 and to ground through the resistance element of a potentiometer P4. The arm of the potentiometer P4 in turn is connected to the screen grids of the pentodes V6 and V7 and is grounded through a capacitor C8. The suppressor grids of the pentodes V6 and V7 are grounded. The primary and secondary windings of the transformer T7 are tapped, the secondary winding being shunted by a resistor R9 and having an upper terminal 108 which is connected by suitable means to the treating electrodes 76.

As a specific example of the values and types of the various components employed in the above described circuit, unless of a conventional nature, are as follows:

| | | | |
|---|---|---|---|
| V1 | 5Y3 | C8 ____mfd__ | 1 |
| V2 | 2050 | P1 | 500K |
| V3 | 6L6 | P2 | 2K |
| V4, V5 | 866A | P3 | 25K |
| V6 | 0B2 | P4 | 25K |
| V7, V8 | 813 | R1 ____meg__ | 2 |
| C1 ____mfd__ | .002 | R2 | 50K |
| C2 ____mfd__ | .005 | R3 | 250K |
| C3 ____mfd__ | 5 | R4 | 50K |
| C4 ____mfd__ | 5 | R5 | 150Ω |
| C5, C6 ____mfd__ | 20 | R6, R7 | 1K |
| C7 ____mfd__ | .05 | R8 | 45K |
| | | R9 | 450K |

The transformer T1 is of a value to provide a B+ voltage of 300 volts. The transformer T6 has 115 volts output. The transformer T3 has an output sufficient to provide the required high voltage, as will be hereinafter set forth. Transformer T7 is a modulation type transformer having a tapped secondary and a tapped primary so that the secondary output is of an adjustable peak voltage peak-to-peak up to about 2000 volts.

In operation of the above circuit network the gas tetrode V2 and the associated network forms a relaxation oscillator having a sawtooth wave output whose frequency may be varied by means of the potentiometer P2 between approximately 300 and 2000 cycles per second. The amplitude of the output of the relaxation oscillator, as taken from the potentiometer P1, is applied to the control grid of the pentode V3 which is operated as a clipper amplifier so that its output, as derived from the secondary of the driver transformer T2, is roughly in the shape of a square wave as designated by 110, the top being relatively flat and the leading edge being almost perpendicular. The output of the pentode P3 is coupled to the control grids of the pentodes V7 and V8 which are class B operating power amplifiers.

The output of the power amplifier is coupled to the treating apparatus by way of the transformer T7 the upper terminal 108 of which is connected to the electrodes 76. The voltage applied to the electrodes 76 is illustrated at 111 and is characterized in being very closely spaced square waves of substantially sharp edges and flat tops, the flat peaks of the square wave being on the positive side and occupying a majority of the voltage application time. It should be noted, furthermore, that the voltage derived from the terminal 108 and as applied to electrodes 76 are always positive and at no time driven negative. The combination of maintaining the electrodes 76 positive and the peak voltage being maintained for a majority of the time is extremely advantageous, permitting greater efficiency and higher treating speeds. Furthermore, while the pulse frequency is shown to be a minimum of 300 cycles per second, and should preferably be at least this frequency, the apparatus will operate at lower frequencies but at lower efficiencies and less desirable operating conditions. The pulse frequency may exceed 2000 cycles per second and may be considerably higher but it is noted that the optimum frequency is a function of the configuration and extent of the various electrodes as well as the material being treated, the rate of treatment and the various dielectrics being employed. With the type of apparatus and circuit last described the preferable range of the fluctuating voltage is between 400 and 4000 volts and the direct voltage between 200 and 2000 volts. Furthermore, by applying a negative static charge to the web being treated as in the earlier embodiment, the D. C. voltage may be correspondingly decreased and under certain conditions even eliminated.

As an example of the practice of the present improved method employing the last described apparatus a 1½ mil polyethylene film 36 inches wide was passed through the apparatus at about 200 feet per minute and during such passage was in contact with the lower drum electrode 70 which had a grounded electrically inducting outer cylindrical surface and the plurality of electrodes 76 formed as above described. The voltage applied to the upper electrodes 76 was derived from the output terminal 108, controls being adjusted so that the pulse frequency rate of the fluctuating voltage was 600 cycles per second and the peak-to-peak voltage was 1500 volts and the D. C. voltage was adjusted to 1200 volts, the combined voltages being such that the voltage applied to the electrode 76 was always positive and varied between 700 and 2700 volts. It is important to note that if the potential were inverted so that the negative terminal was applied to the electrodes 76 the treatment would be substantially reduced so as in many cases to be practically undesirable. It should be further noted that by reason of the shape of the pulses the maximum positive potential occupies approximately 80% of the total time. The average wattage delivered to the electrodes was about 200 watts. At the above operating conditions an excellent treatment was effected so that the surface of the polyethylene which traveled in contact with the electrodes 76 was highly receptive and retentive of inks, adhesives, coatings and other materials which it would not normally receive. Furthermore, the opposite face of the polyethylene web exhibited no significant change.

A 1½ mil, 36 inch wide polyethylene film containing a medium amount of a conventional slip material was run through the apparatus in the above manner at 100 feet per minute, the pulse voltage being increased to a peak-to-peak voltage of 2000 and the D. C. voltage was increased to 1500 volts. The energy delivered to the electrodes was approximately 200 watts and the treatment of the material for the purposes herein set forth was excellent.

In employing the apparatus last described, as in the use of the earlier apparatus, the application of a negative charge to the traveling web is highly desirable and results in a reduction of the required voltages. The frequencies and voltages employed as well as the time of exposure of the material to be treated varies principally with the type of treated material. Thus, polyethylene without any additives requires lower voltages and less time of exposure than polyethylene containing the conventional slip agents, the voltages and time of exposure increasing with the amount of slip agent. It should be noted that the energy dissipated and the material being treated should be enough to realize the desired modification of the treated surface but should not be excessive so as to effect any fusion of the treated surface or to otherwise adversely effect the material. The amount of treating energy, of course, depends on the desired end use of the material as well as the type of material being treated. For example, in the treatment of 2 mil polyethylene film the range of energy should be between approximately 0.2 watt minute per square foot and 1.0 watt minute per square foot depending upon the extrusion age and temperature of the treated material and other conditions. As a general rule the energy required increases with the thickness of the treated material.

It should be further noted that while the present apparatus and process have been described in connection with the treatment of continuous webs individual articles may be treated which articles may be flat or of other contours. Such articles may be subjected to the treatment by the while being moved or in a stationary manner sandwiched between a pair of correspondingly shaped contacting electrodes.

From the above there as been provided an improved method and apparatus for the treatment of the surface of an organic synthetic thermoplastic material such as polyethylene with or without slip agents, polychlorotrifluoroethylene, polyvinyl chloride, nylon, Mylar, etc. to render or improve the characteristics of such surface to permit the acceptance and retention of inks, adhesives, coatings, laminates, and other materials.

While there has been described and illustrated preferred embodiments of the present invention, it is apparent that numerous alterations and omissions may be made without departing from the spirit thereof.

The present application is a continuation-in-part of the copending application of Francis Neill Rothacker, Serial No. 562,189, filed January 30, 1956, now abandoned.

I claim:

1. The improved method of treating a synthetic, organic, thermoplastic article comprising disposing said article between and in contact with the opposing faces of a pair of first and second electrodes, the face of said first electrode being formed of a solid first dielectric material having a higher dielectric loss factor than said plastic article and the face of said second electrode being formed of a material selected from the class consisting of good electrical conductors and dielectric materials having a dielectric loss factor less than said first dielectric material, an electric voltage being connected between said electrodes, said voltage fluctuating at a frequency of at least 300 cycles per second and said fluctuation having an amplitude of at least 400 volts, the potential of said first electrode being positive with respect to said article for at least a part of the time whereby to alter the surface properties of said thermoplastic article in contact with said first dielectric material to increase the receptive properties thereof.

2. The improved method in accordance with claim 1, wherein said electric voltage comprises a D. C. voltage and a superimposed pulsating voltage, the positive side thereof being connected to said first electrode.

3. The improved method in accordance with claim 2, wherein said D. C. voltage is between 200 and 2000 volts and said voltage pulsations have an amplitude between 400 and 4000 volts.

4. The improved method in accordance with claim 1, wherein the surface of said second electrode is formed of an electrical conducting material.

5. The improved method in accordance with claim 1, wherein the surface of said second electrode is formed of a material similar to the material forming said thermoplastic article.

6. The improved method in accordance with claim 1, wherein said voltage fluctuations are of sharp edged configuration.

7. The improved method in accordance with claim 1, wherein said first electrode is at a positive potential relative to said article for a majority of the time.

8. The improved method in accordance with claim 1, including the step of applying a negative static charge to said article before being contacted by said electrodes.

9. Te improved method in accordance with claim 1, wherein said first electrode is substantially always at a positive potential relative to said article.

10. The improved method in accordance with claim 1, wherein said voltage fluctuations are of substantially flat-topped configuration.

11. The improved method in accordance with claim 1, wherein the electrical energy dissipated on the surface of said article is insufficient to effect the fusion thereof.

12. The improved method in accordance with claim 1, wherein said first dielectric material has a dielectric loss factor greater than 0.01 at 1000 cycles per second.

13. The improved method in accordance with claim 1, wherein said thermoplastic material forming said article is selected from the class consisting of polyethylene, polytetrafluoroethylene, polymonochlorotrifluoroethylene, nylon, polyvinyl chloride and polyethylene terephthalate.

14. The improved method in accordance with claim 1, wherein said electrodes are in the form of rotating cylinders.

15. The improved method of treating a synthetic, organic, thermoplastic webbing selected from the class consisting of polyethylene, polytetrafluoroethylene, polymonochlorotrifluoroethylene, nylon, polyvinyl chloride and polyethylene terphthalate comprising transporting said webbing between a pair of first and second rotatable cylinders while concurrently contacting the surface of said cylinders, said first cylinder having a surface formed of a dielectric first material having a dielectric loss factor greater than said organic thermoplastic webbing, and greater than 0.01 to 1000 cycles per second and said second cylinder having a surface selected from the class consisting of good electrical conductors and second dielectric materials having a dielectric loss factor less than said first dielectric material and applying an electric voltage between said cylinders, said voltage fluctuating at a frequency of at least 300 cycles per second and said fluctuation having an amplitude of at least 400 volts the potential of said first cylinder being at least part of the time positive relative to said webbing whereby to alter the surface properties of said webbing in contact with said first electrode to increase the receptive properties thereof.

16. The improved method in accordance with claim 15, wherein said electric voltage comprises a D. C. voltage and a superimposed pulsating voltage, the positive side thereof being connected to said first cylinder.

17. The improved method in accordance with claim 15, wherein the surface of said second cylinder is formed of an electrical conducting material.

18. The improved method in accordance with claim 15, wherein said voltage fluctuations are of sharp-edged configuration.

19. The improved method in accordance with claim 15, wherein said first cylinder is at a positive potential relative to said second cylinder for a majority of the time.

20. The improved method in accordance with claim 15, including the step of applying a negative static charge to said webbing before being contacted by said cylinders.

21. The improved method in accordance with claim 15, wherein the electrical energy dissipated on the surface of said webbing is insufficient to effect the fusion thereof.

22. The improved method in accordance with claim 15, wherein said D. C. voltage is between 200 and 2000 volts and said voltage pulsations have an amplitude between 400 and 4000 volts.

23. The improved method in accordance with claim 15, wherein said second cylinder has a surface selected from the class consisting of polyethylene, polytetrafluoroethylene, polymonochlorotrifluoroethylene, nylon, polyvinyl chloride and polyethylene terephthalate.

References Cited in the file of this patent

FOREIGN PATENTS

| 1,058,934 | France | Nov. 10, 1953 |
| 722,875 | Great Britain | Feb. 2, 1955 |

OTHER REFERENCES

"Modern Plastics," July 1955, pages 105, 106, 108 and 205.